(12) United States Patent
Bergman

(10) Patent No.: US 9,575,977 B1
(45) Date of Patent: Feb. 21, 2017

(54) DATA MANAGEMENT SYSTEM

(71) Applicant: John H. Bergman, Grapevine, TX (US)

(72) Inventor: John H. Bergman, Grapevine, TX (US)

( * ) Notice: Subject to any disclaimer, the term of this patent is extended or adjusted under 35 U.S.C. 154(b) by 232 days.

(21) Appl. No.: 14/065,384

(22) Filed: Oct. 28, 2013

Related U.S. Application Data

(60) Provisional application No. 61/719,899, filed on Oct. 29, 2012.

(51) Int. Cl.
*G06F 17/30* (2006.01)

(52) U.S. Cl.
CPC .............................. *G06F 17/30088* (2013.01)

(58) Field of Classification Search
CPC ...... G06F 21/56; G06F 21/6218; G06F 21/64; G06F 2221/2143; G06F 21/00; G06F 21/564; G06F 21/60; G06F 17/30303; G06F 21/6254; G06F 2212/7205; G06F 17/30575; G06F 21/6245; G06F 17/30088; G06F 17/3015; G06F 11/1453; G06F 3/0641; G06F 17/30156

USPC ................................ 707/662, 663, 664, 689
See application file for complete search history.

(56) References Cited

U.S. PATENT DOCUMENTS

| | | | |
|---|---|---|---|
| 2003/0163493 A1* | 8/2003 | Burns | G06F 11/1448 |
| 2006/0143476 A1* | 6/2006 | McGovern | G06F 21/6218 713/191 |
| 2010/0205189 A1* | 8/2010 | Ebrahimi | G06F 21/6227 707/757 |
| 2012/0158760 A1* | 6/2012 | Borden | G06F 17/30097 707/758 |

* cited by examiner

*Primary Examiner* — Evan Aspinwall

(57) ABSTRACT

A method and apparatus for tracking purged data includes at least one of a data deletion module and a data deletion registry that are used to compare data, records and files of at least one computing unit to determine of any of the data, records or files stored within the computing unit have previously been purged. If so, the data, record or file is re-purged. Purging can include deleting the entire data, record or file or just a portion to anonymize the data record or file. Alternatively, instead of deleting all or a portion of a data, record or file, an encryption key required to access all or a portion of the data, record or file may be deleted thereby rendering the encrypted information inaccessible. Differing schemes and method for purging data, records and files may be utilized within a network.

15 Claims, 22 Drawing Sheets data deletion network 10 purge data by deletion

| record/file no. | j. badboy | street address | city, county, state, zip code | convicted crime |
|---|---|---|---|---|

Fig. 2

20 purge data by deletion of encryption key

| col. a | col. b | col. c | col. d |
|---|---|---|---|
| encrypted name 1 | encryption key 1 | encrypted para. a | encrypted para. d |
| encrypted name 2 | encryption key 2 | encrypted para. b | encrypted para. e |
| encrypted name 3 | encryption key 3 | encrypted para. c | encrypted para. f |

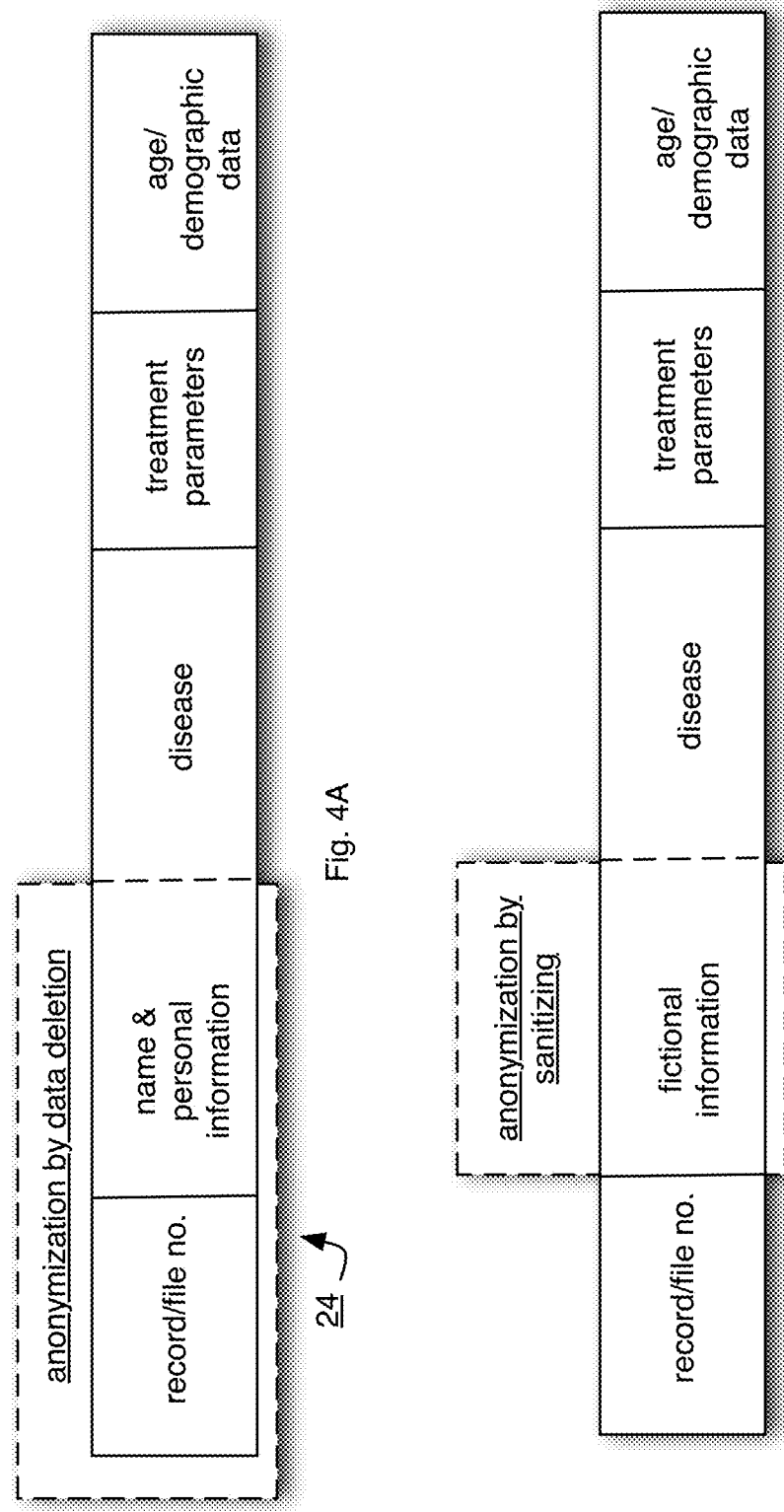

| record/file no. (encrypted) | name & personal information (encrypted) | street address (encrypted) | city, county, state, zip code | convicted crime | anonymization by encryp. key deletion

DATA MANAGEMENT SYSTEM

BACKGROUND

1. Technical Field

The present invention relates to data management systems, networks, and methods.

2. Related Art

In today's computer age, data can live forever. Because of the ease with which data can be duplicated, computer devices, systems, networks, etc. have associated programs, hardware, protocols and methods for duplicating files and data. It is common practice to purchase disk drives, for example, whose sole purpose is to back up designated files. Further, it is also common to duplicate an entire computing unit or even network to assist with disaster recovery. For example, networks are duplicated in prior art networks in different cities so that, in the case of calamity to a geographic area, the duplicate network can step in and provided the expected services.

Not all data, however, should have a long life. For example, criminal records are often ordered by a court to be expunged (purged). Because of modern backup systems, however, such expunged records may eventually reappear. Similarly, private and personal information that is given to a company, organization or other entity will often have such information duplicated through back up systems, protocols, and methods. Once a relationship is terminated, it is desirable to have such data destroyed. Because of backup systems, again, purged data may re-appear. Similarly, companies often exchange confidential information and trade secrets. Confidentiality agreements require such information to be returned upon termination of the arrangement defined in the confidentiality agreement. And, once again, data that is "returned" and/or purged may reappear resulting in a breach of an agreement and potentially creating liability.

SUMMARY OF THE INVENTION

A system, method, apparatus and network operate to ensure the purging of data and to ensure that such data remains purged. Two types of purging may occur. A record may be completely deleted or it may be made anonymous. In one embodiment, purge data is produced to a data deletion registry that maintains a record of purge data. The purge data is produced to a computing unit that operates to compare the purge data to its stored data records to determine if a purged record has re-appeared. In another embodiment, the purge data is produced to a data deletion module that communicates with computing units to search the data within the computing unit to determine if a purged record has been restored (e.g., from a backup process, etc.) or has re-appeared for other reasons. In either case, any record that is identified as having been previously purged is present and therefore is purged once again.

In its most basic form, the above methods and apparatus apply to a single computing unit and a single data deletion module. In other embodiments, the system and methods may be expanded to monitor for purged records across devices within a network, backup devices and within other networks. Examples of why such a file may be present on different networks includes employees with access to the records having computing units on different networks as well as backup networks (disaster recovery type networks).

BRIEF DESCRIPTION OF THE DRAWINGS

A better understanding of the present invention can be obtained when the following detailed description of the preferred embodiment is considered with the following drawings, in which:

FIGS. 2-5 are exemplary diagrams that illustrate differing types of data purging.

DETAILED DESCRIPTION OF THE DRAWINGS

Figure 1:
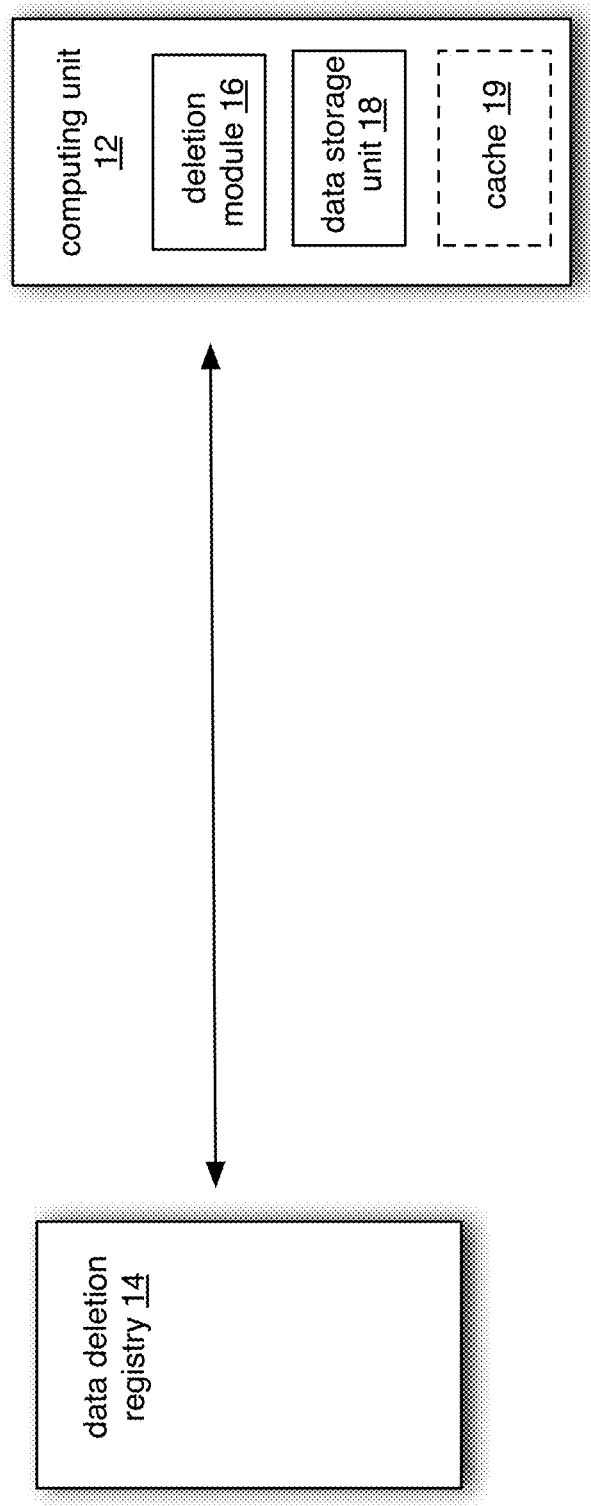
FIG. 1 is a system diagram of a data deletion registry in communication with a computing unit according to one embodiment of the invention.

FIG. 1 is a system diagram of a data deletion registry in communication with a computing unit according to one embodiment of the invention. A computing unit 12 communicates with a data deletion registry 14 to monitor file activity so that, when a permanently purged file reappears, it may be re-purged. For example, if a purged file reappears within data storage unit 18, deletion module 16 will identify it after comparing the data records stored within data storage unit 18 to the contents of data deletion registry 14. In one embodiment, data deletion module 16 (which is local to and disposed within computing unit 12) communicates with data deletion registry 14 to compare the contents of data deletion registry 14 with data, records and files stored within data storage unit 18 of computing unit 12 determine if any previously purged data, records or files have been restored or rebased (meaning they have been moved or copied from one location to another). Data deletion registry 14 may be external to computing unit 12 as shown or it may be disposed within and be a part of computing unit 12. For example, data deletion registry 14 may comprise database software and associated data stored within computing unit 12 (e.g., within data storage unit 18). In one alternative embodiment of computing unit 12, computing unit 12 includes a cache 19 for storing purge information either produced to or received from data deletion registry 14 or both. Accordingly, utilizing such a cache is advantageous in that it reduces access time to purge information and also reduces communication traffic. While this cache is not shown in other figures that include a computing unit such as computing unit 12, it should be understood that a cache 19 may optionally be included.

FIGS. 2-5 are exemplary diagrams that illustrate differing types of data purging. There are multiple different manners and aspects of purging data records. FIG. 2 shows that a data record may be purged by deleting the complete or entire data, record or file. FIG. 3 shows that a data, record or file may be purged by deleting an encryption key that is unique to data within a data record or file. FIG. 4A shows that a data record may only partially purged make the data record anonymous. For example, a record/file number, name and personal information are deleted while a disease type, treatment parameters, and demographic data is kept. This particular record is an exemplary health history record, but the principle may be expanded to many other types of records including, but not limited to financial and criminal records. While FIG. 4A shows that the record/file number as well as the name and personal information are deleted, it should be understood that this is exemplary. Alternatively, only the name and personal information is deleted. FIG. 4B shows and alternative to deletion. Another form of purging shown in FIG. 4B is the sanitizing of records. Sanitizing herein refers to replacing real information with fictional information. For example, instead of using a person's real name and address, a made up or fictional name and address may be used to replace the actual information. In the example of FIG. 4B, sanitizing the record by replacing only the name and address with fictional information is beneficial in that the record/file number is maintained. This allows for a data deletion module to search for purged records by record/file number to verify that the purged information has actually been purged and a copy of the record with actual personal information is not present. Referring back to FIG. 4A, for the same reasons, only the name and personal information could be deleted to keep the record/file number.

FIG. 5 shows that a portion of a data record may be purged by deleting an encryption key that is used to encrypt portions of the data record. Here, deleting the encryption key renders the record/file number, the name and personal information, and the address of a person inaccessible while the location information and crime conviction information is not stored with encrypted keys and therefore is not lost by deletion of the encryption key. Thus, the data record is anonymized by deletion an encryption key that is used to encrypt specified identifying information of the record or file.

Figure 6:
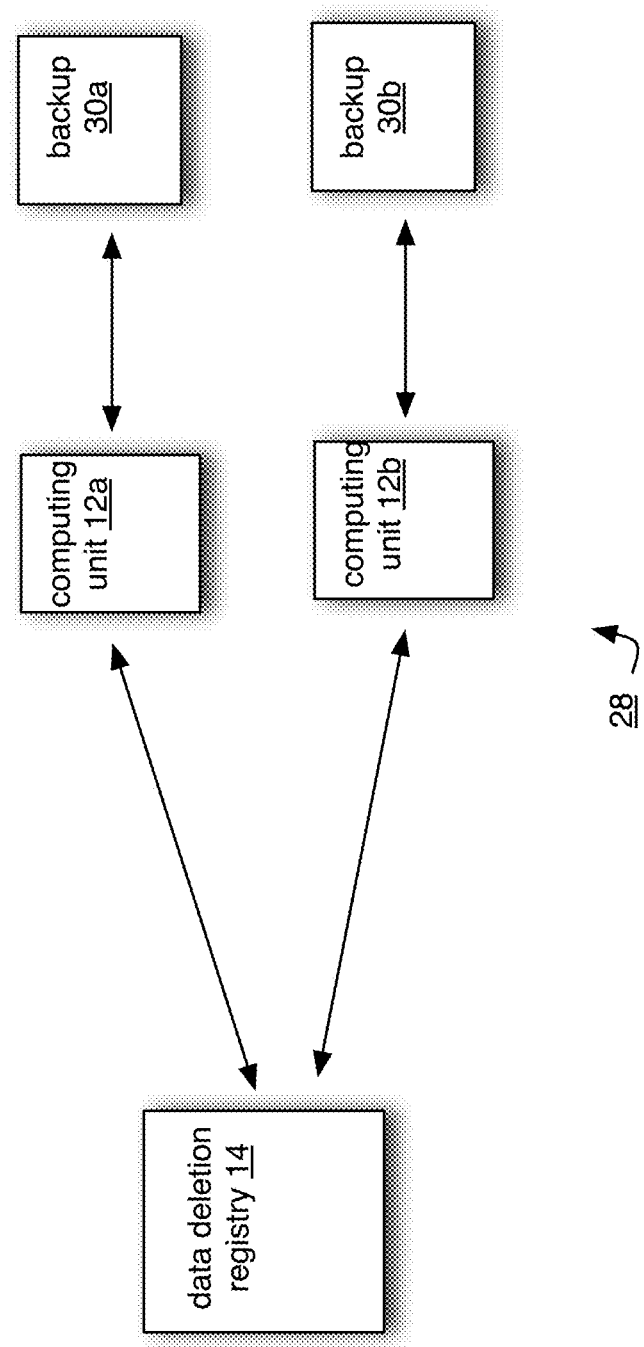
FIG. 6 is a system diagram for tracking purged data.

FIG. 6 is a system diagram for tracking purged data. As may be seen, a computing unit 12a communicates with a backup unit 30a to back up important files and data resident on computing unit 12a. From time to time, backup unit 30a produces backup files to computing unit 12a for restoration thereon. Accordingly, a previously purged file may be rebased or restored in computing unit 20a. One aspect of this embodiment of the invention is that computing unit 12a communicates with data deletion registry 14 (which is used to track purged data, records and files) to determine whether any of the data, records or files within computing unit 12 had previously been purged. In one embodiment, record ID numbers (locator numbers) are stored in data deletion registry 14. Record ID numbers can include file numbers, social security or other identifying numbers or ID keys that are stored within the data, records and files. If any data, record or file stored within computing unit 12 as a record ID number stored within data deletion registry 14, then that data, record or file is one that is a duplicate of a previously purged file and is subsequently re-purged. It should be understood that there are many forms of identifying records that may be used. For example, a record ID number may be a case number or a social security number or, alternatively, one or more fields within the data of unique identifiers.

Figure 7:
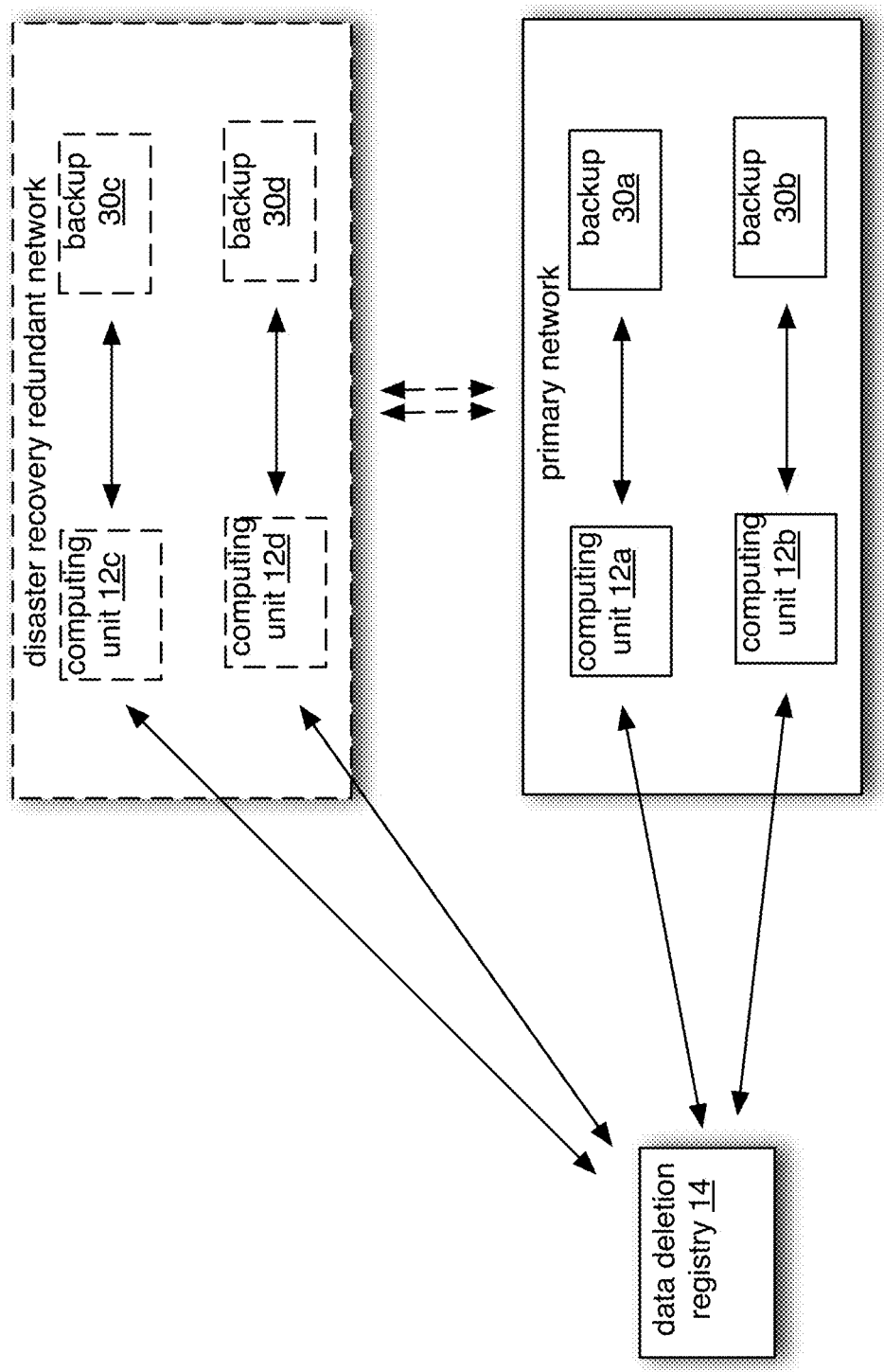
FIG. 7 is a system diagram for tracking purged data for a primary network and a redundant network.

FIG. 7 is a system diagram for tracking purged data for a primary network and a redundant network. In comparing FIG. 7 to FIG. 6, it may be seen that the network of computing units 12a and 12b and backup units 30a and 30b are redundantly duplicated for emergency restoration processes (disaster recovery). As is known to one of average skill in the art, entire networks may be duplicated in a separate geographic location in the event of a catastrophe in the location of the primary network. Such redundant networks typically have the same or similar hardware and software so that services may be restored relatively seamlessly. As such, the redundant network represents a snap shot of a primary network. As such, files that are purged in the primary network may exist either in the associated backup units for the computing units and in the redundant computing units and backup units. The embodiment of FIG. 7, therefore, illustrates that the redundant network also communicates with the data deletion registry (perhaps upon activation of the redundant network) to identify and subsequently purge records or files that had been previously purged by the computing units of the primary network. One aspect of the network of FIG. 7 is that the primary network is duplicated as the disaster recovery redundant network. Accordingly, a file subsequently purged from the primary network may continue to exist in one or more locations of the redundant network. In the event that operations to restore the primary network based on the contents of the redundant network take place, a need exists to re-scan the primary network for previously purged data, records and files that are present. In a criminal case, for example, a particular record may exist within computing unit 12a, backup unit 30a, computing unit 12c and backup unit 30c.

Figure 8:
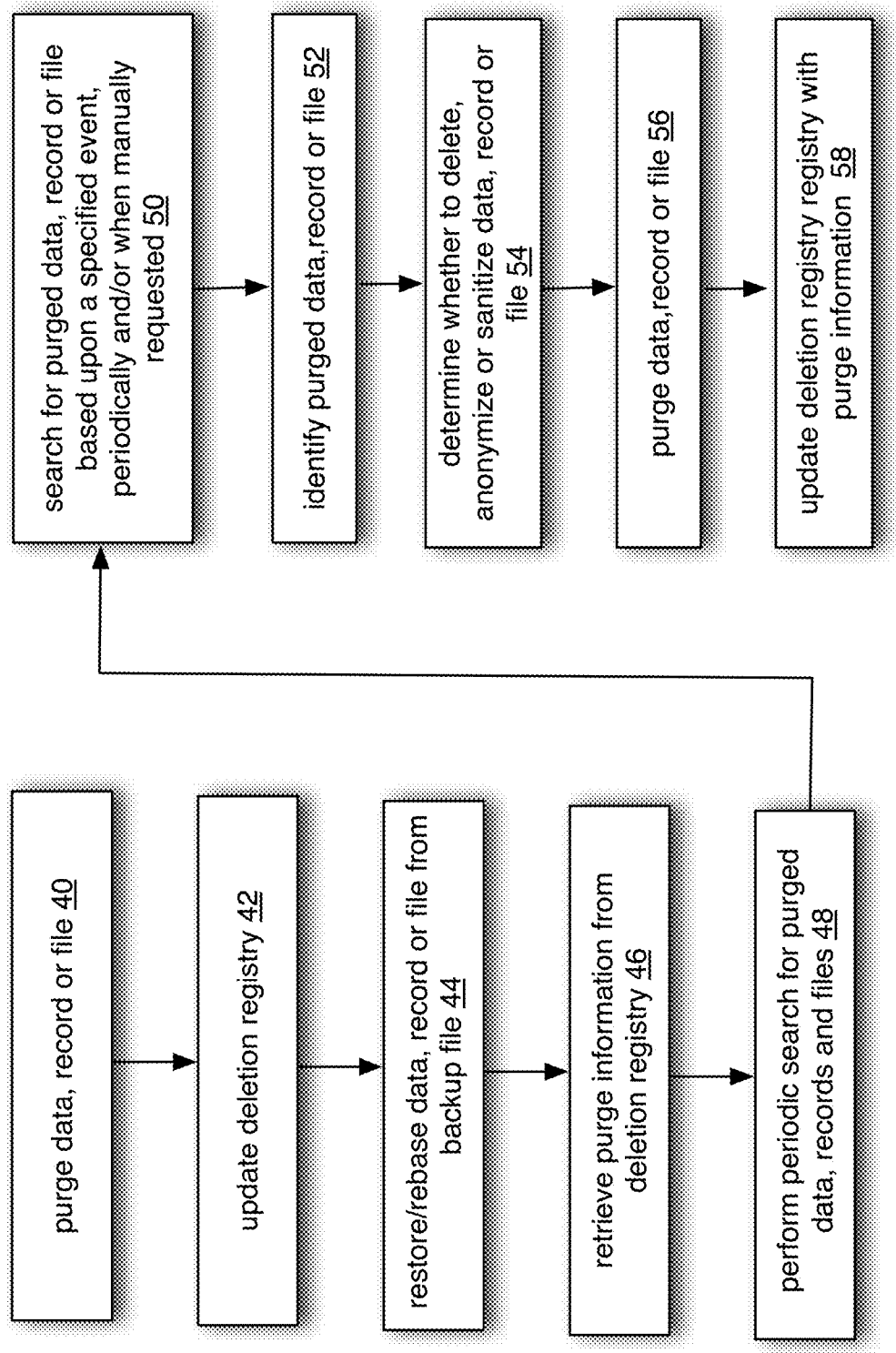
FIG. 8 is a flow chart that illustrates a method according to one embodiment of the invention.

FIG. 8 is a flow chart that illustrates a method according to one embodiment of the invention. The method of FIG. 8 includes purging a record, updating a deletion registry, restoring or rebasing a record from a back up file, retrieving deletion data from the deletion registry, performing a period search or requested search for purged data or records, identifying a purged record, determining whether to delete or anonymize the record, and updating the deletion registry with purge information.

Figure 9:
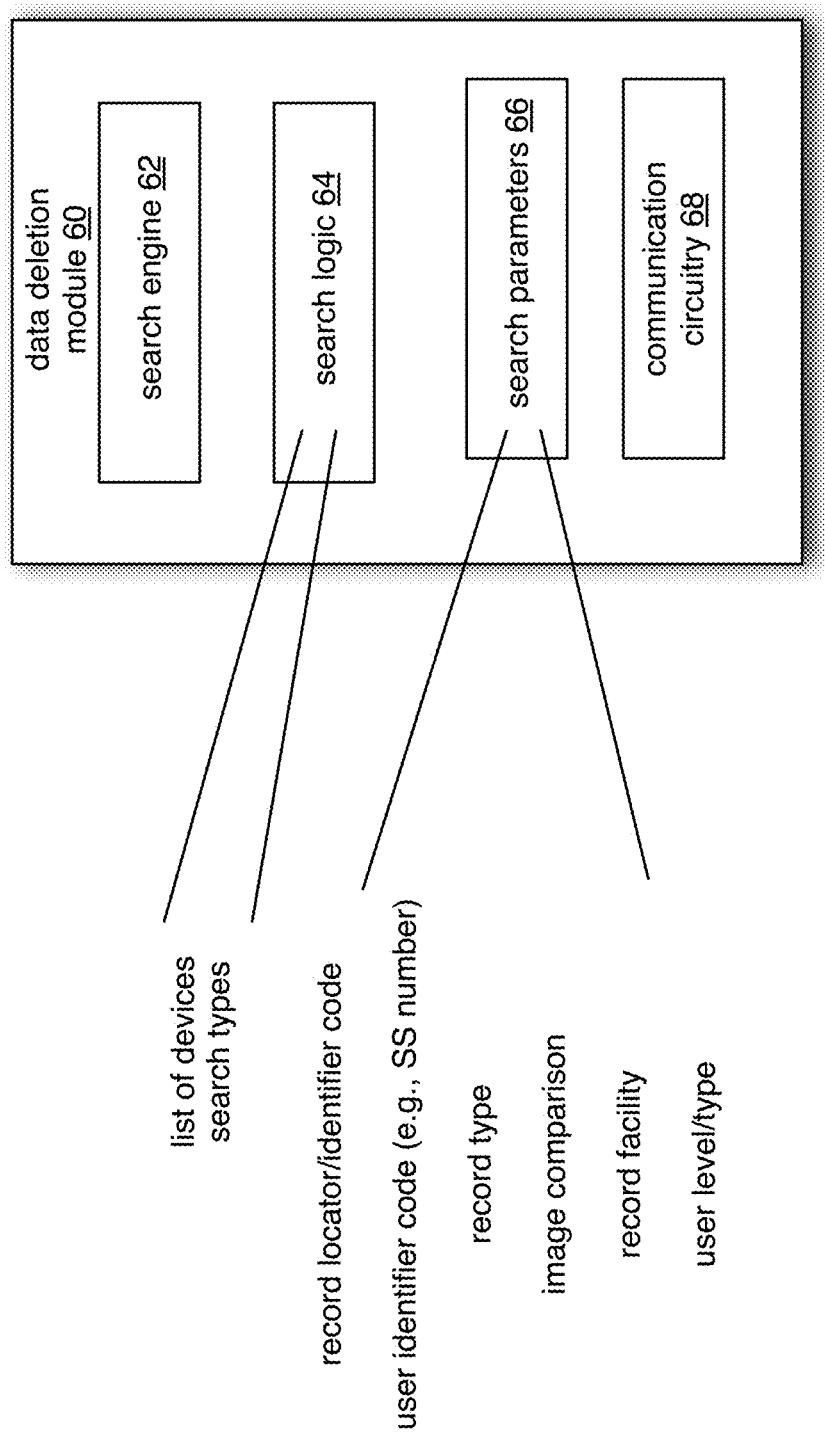
FIG. 9 is a functional block diagram of a data deletion module.

FIG. 9 is a functional block diagram of a data deletion module. The data deletion module 60 includes a search engine 62, search logic 64, a search parameters module 66 that stores specified search parameters that is used by search logic 64 to define the search performed by search engine 62. The search engine 62 communicates with other devices and networks via communication circuitry 68. The communication circuitry may include any known type of wired or wireless communication circuitry. Elements of the data deletion module 60 are shown. Module 60 is operable to establish a comm. link with an agent on a host device that gives module 60 search privileges to search for previously purged files. The search can be based on record locator/identifier codes, user identifier codes, record type, file image comparison, record facility, and user level/type.

Figure 10:
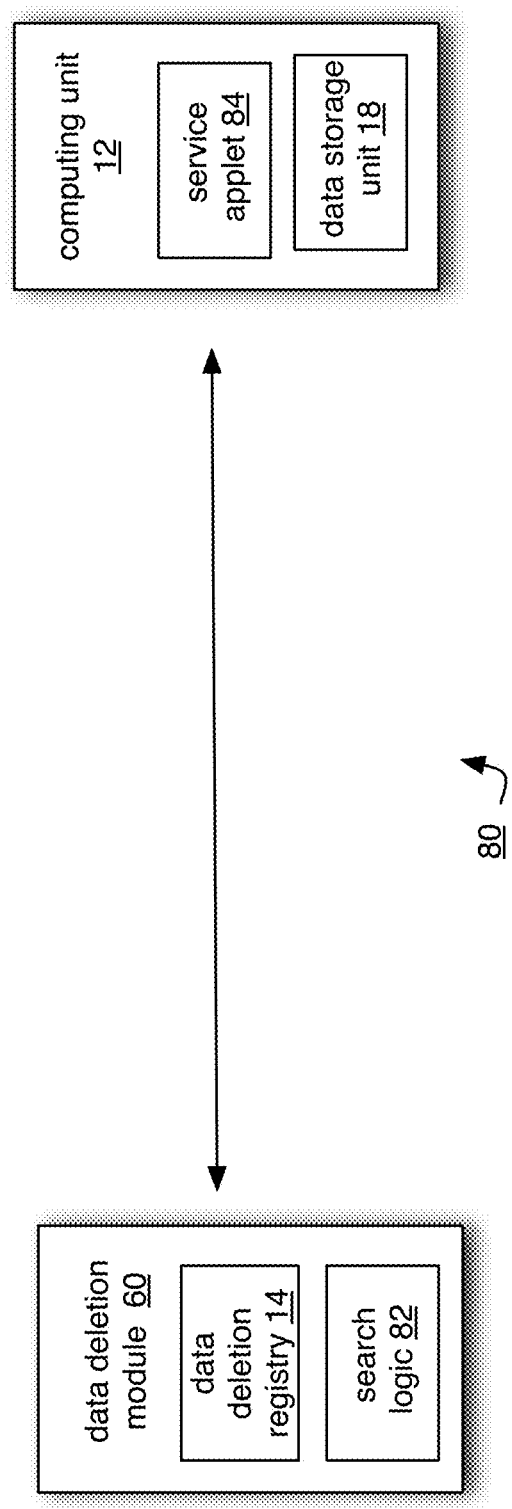
FIG. 10 is a system diagram of a data deletion module in communication with a computing unit according to one embodiment of the invention.

FIG. 10 is a system diagram of a data deletion module in communication with a computing unit according to one embodiment of the invention. A network 80 includes computing unit 12 and data deletion module 60. Data deletion module 60 includes data deletion registry 14 and search logic 82. Data deletion registry 14 is shown to be a part of data deletion module 60. It may readily be disposed within a remote server within the same network or within a cloud based server. In any of these alternative embodiments, however, data deletion module 60 is communicative coupled with a data deletion registry. Generally, data deletion module 60 may further include any or all of the components described in relation to FIG. 9. In an embodiment in which data deletion registry 14 is remote, one embodiment of data deletion module 60 may include a cache to store purge information received from or updated to data deletion registry 14 to reduce communication traffic and improve response time.

Here, data deletion module 60 establishes a communication link with computing unit 12, and more specifically with service applet 84 to gain access to memory devices, structures and elements referenced as data storage unit 18. Via service applet 84, data deletion module 60 searches for data, records and files that are stored therein that had been previously purged. Thus, if a file, data or record that was previously purged is reintroduced, it may be re-purged.

Figure 11:
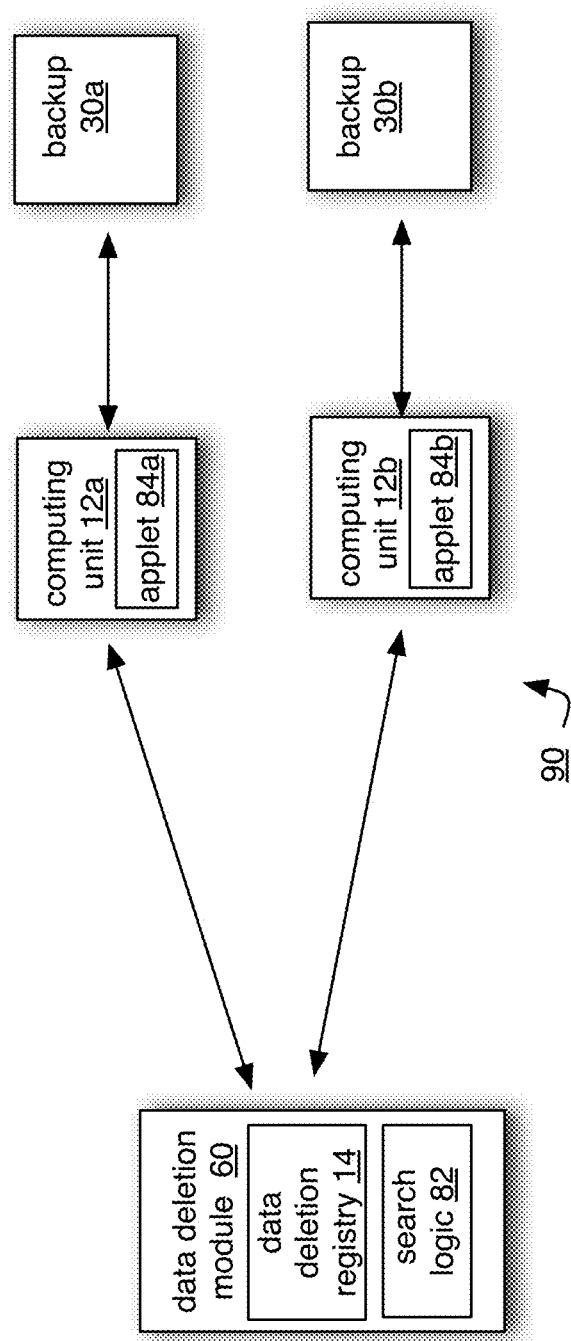
FIG. 11 is a system diagram for tracking purged data that includes a separate data deletion module.

FIG. 11 is a system diagram for tracking purged data that includes a separate data deletion module. A network 90 includes data deletion module 60 that searches for data, records, and files that were previously purged from computing units 12*a* or 12*b* but then restored from backup 30*a* or 30*b*, respectively. More specifically, data deletion module 60 communicates with applets 84*a* or 84*b* to perform the searches within computing units 12*a* or 12*b*. In one embodiment, these communications are via an encrypted tunnel. While FIG. 11 references a network 90, similar operations exist for implementations where the data deletion registry and/or data deletion module are disposed locally as described in relation to other figures herein.

Figure 12:
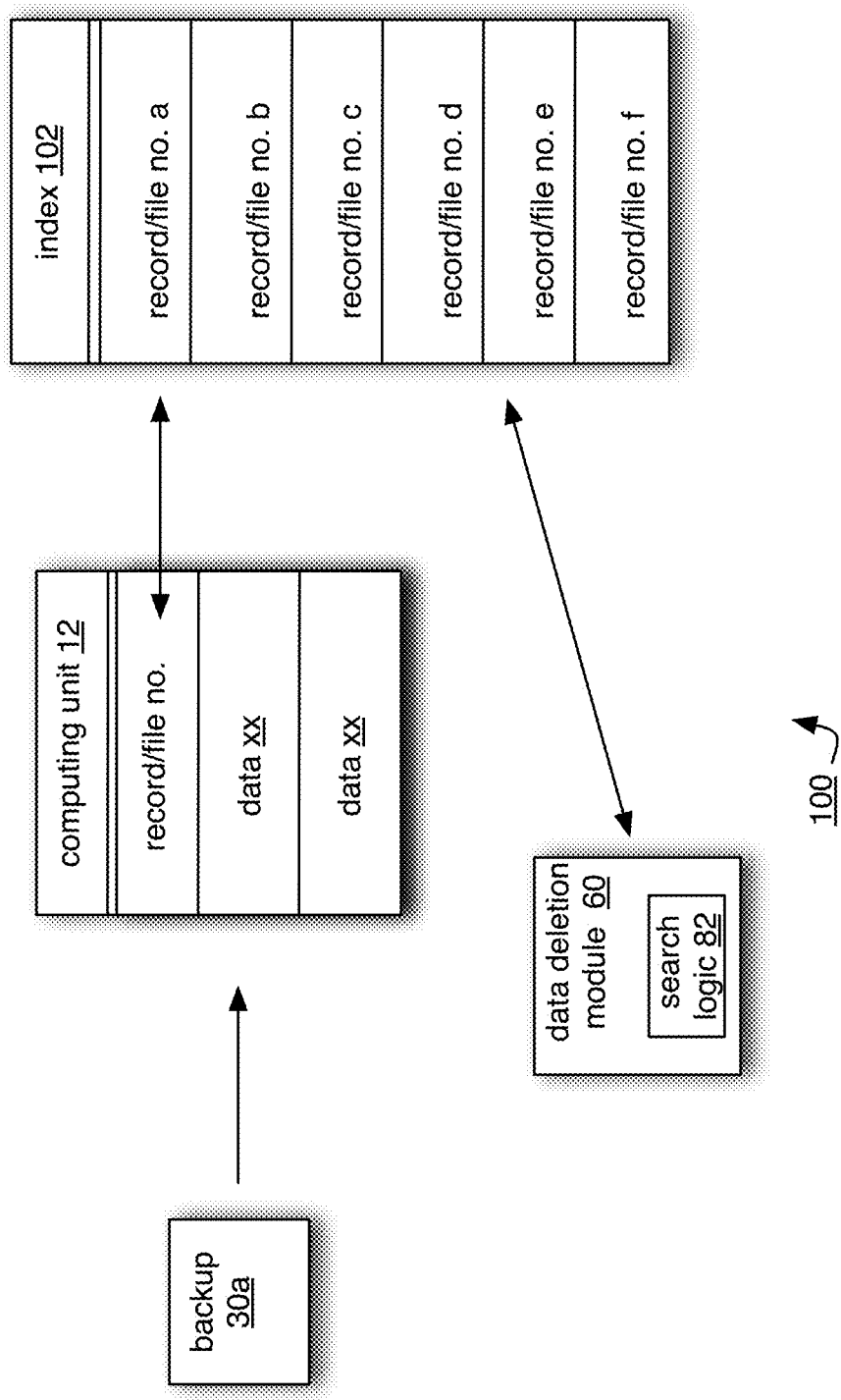
FIG. 12 is a system diagram for tracking purged data that includes a data indexing system.

FIG. 12 is a system diagram for tracking purged data that includes a data indexing system. FIG. 12 generally shows that, within a network 100, an index may be created of record/file numbers (a-f are shown) for records/files that are stored within computing unit 12 as well as other computing units. Data deletion module 60 searches index 102 in relation to a data deletion registry to determine if any of the data, records or files stored within computing unit 12 or other computing units have been previously purged. In one embodiment, a computing unit or other device generates an index for data files or records. In the example shown, an index of record/file numbers is generated. A hashing algorithm is executed to search the index for record/file numbers for data records that had previously purged. Every time a backup file is rebased or restored, the index is updated thereby rendering previously purged files detectable for subsequent purging.

Figure 13:
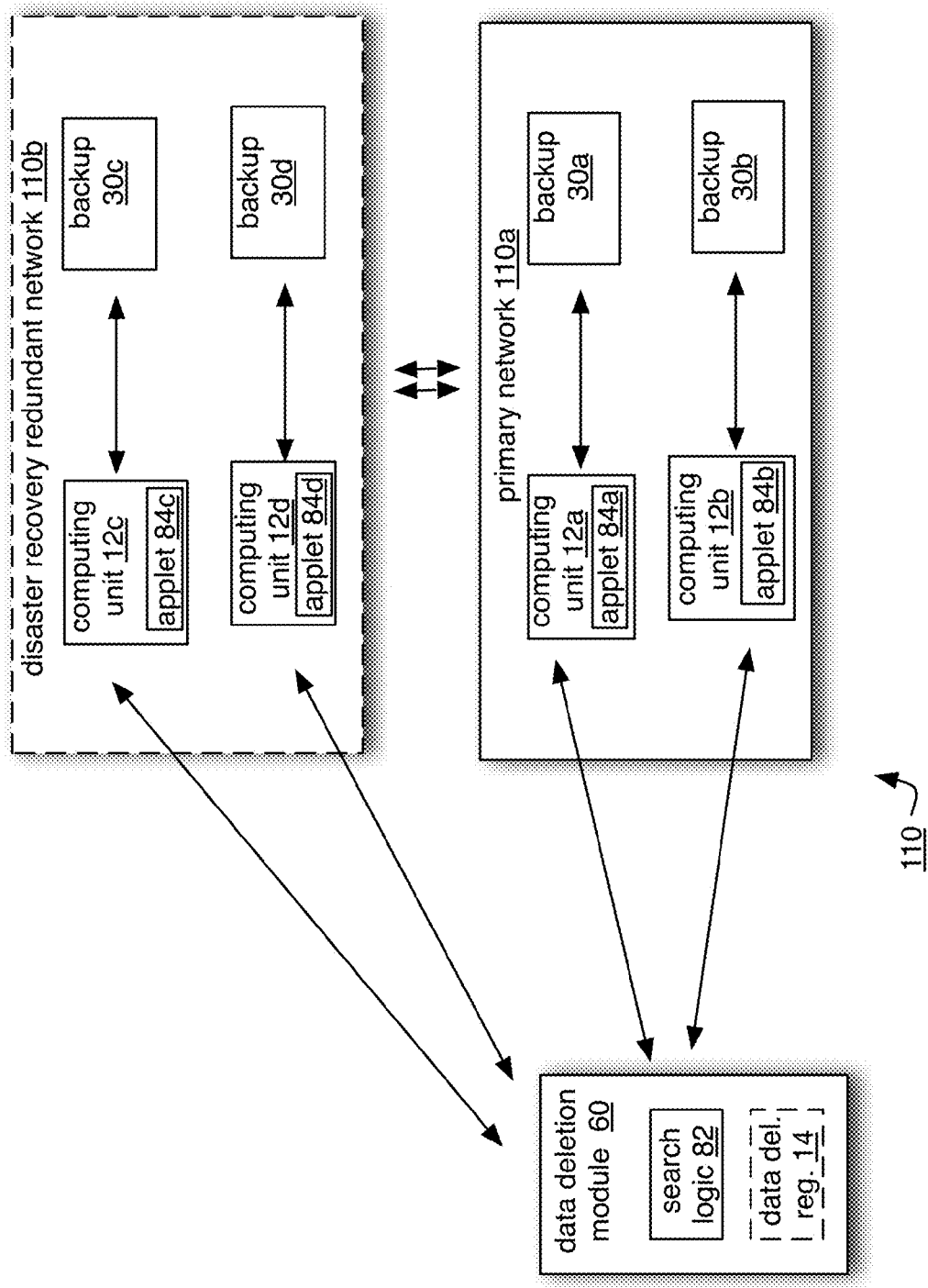
FIG. 13 is a system diagram for tracking purged data for a primary network and a redundant network that includes at least one separate data deletion module.

FIG. 13 is a system diagram for tracking purged data for a primary network and a redundant network that includes at least one separate data deletion module. A data network 110 includes a primary network 110*a* and a redundant network 110*b*. Redundant network 110*b* includes duplicated hardware, software and data in relation to primary network 110*a*. If, for example, a data record is purged from computing unit 12*a*, copies of that deleted data record may be found within backup 30*a*, computing unit 12*c* and backup 30*c*. Thus, if backup data is provided by backup 30*a* to computing unit 12*a*, the record may reappear within computing unit 12*a* after the initial purge. Similarly, when redundant network 110*b* is activated or operating, computing unit 12*c* may include a copy of the purged record. As such, data deletion module 60 communicates with the applets 84*a* and 84*c* to perform searches of computing units 12*a* and 12*c*, respectively to find and re-purge the restored record. Thereafter, the purged record may be re-based from backup 30*c*. Accordingly, as this example illustrates, there are multiple types of events that may cause a purged record to re-appear. Thus, one aspect of the embodiments of the invention is that the searches are performed across a plurality of networks and devices a plurality of times. These searches may be periodic (i.e., scheduled), event driven (i.e., upon receiving data, files or records), and when manually requested or based upon all of these types of conditions or triggers.

One aspect of the network of FIG. 13 is that the primary network is duplicated as the disaster recovery redundant network. Accordingly, a file subsequently purged from the primary network may continue to exist in one or more locations of the redundant network. In the event that operations to restore the primary network based on the contents of the redundant network take place, a need exists to re-scan the primary network for previously purged data, records and files that are present. In a criminal case, for example, a particular record may exist within computing unit 12*a*, backup unit 30*a*, computing unit 12*c* and backup unit 30*c*. Thus, when the data, record or file is ordered by a court to be expunged, the data, record or file may re-appear due to backup, restoration, and other operations. One aspect of the embodiment of FIG. 13 is that data deletion module 60 is operable to perform searches for purged data, records and files within each of the computing units 12*a*-12*d* and backup units 30*a*-30*d* in addition to performing searches on primary computing units when specified events such as backup or restoration activities take place.

Figure 14:
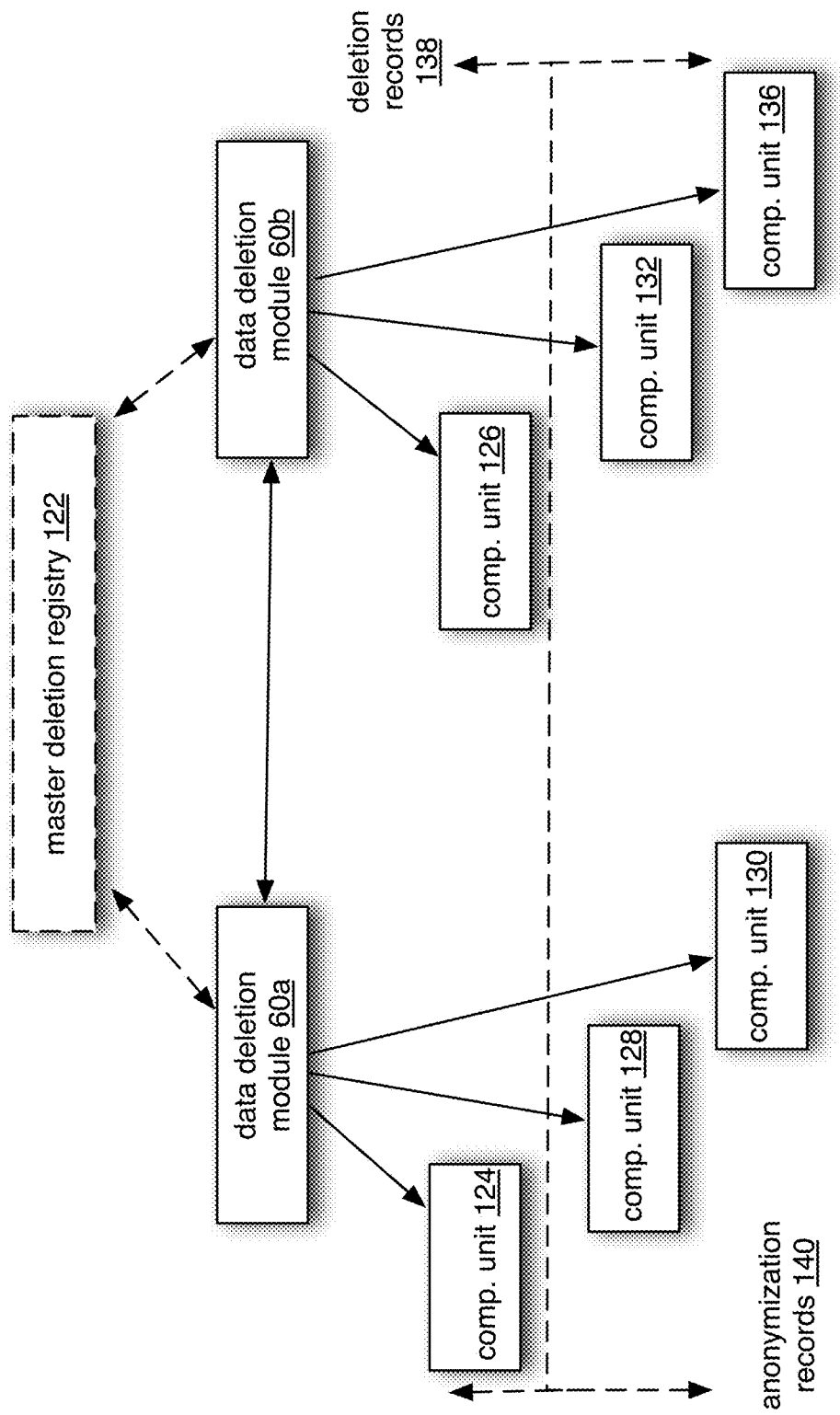
FIG. 14 is a network diagram that illustrates different levels or types of purging across the network.

FIG. 14 is a network diagram that illustrates different levels or types of purging across the network. In one embodiment, a network shown generally at 120 includes data deletion module 60*a* or 60*b* that identifies and purges data, records and files that have been purged before. The data deletion modules 60*a*-*b* purge data, records and files according to, for a host computing unit 124-136, whether they are to be purged entirely or partially to render the data, records and files anonymous (anonymize the data, records and files). Additionally, the data deletion modules provide 60*a* and 60*b* update and receive updated purge data, records and files to/from a master deletion registry 122.

Data deletion modules 60*a*-60*b* are also operable to send/receive deletion information about purged data, records and files to/from other deletion modules. One aspect of the embodiment of FIG. 14 is that computing units 124 and 126 purge data, records and files by deletion of the entire data, record(s) and file(s). This is shown by the dashed line that indicates that all computing units above the dashed line, as shown at 138, delete data, records and files to purge them. In contrast, computing units 128-136 anonymize data, records and files to maintain some information for other purposes (statistical evaluations, etc.). These computing units are the ones shown generally at 140. With respect to whether data, records and files are deleted in whole or in part to anonymize the data, records and files, the term delete (or deletion) can refer to actual deletion of the record or deletion of a required encryption key so that the record or record portion may not be accessed in the future.

In one embodiment, a deletion module purges records according to, for a host computer, whether they are to be purged entirely or partially to anonymize the records. Additionally, the deletion module may provide updates and receive updated purge records to/from a master deletion registry. Deletion modules are also operable to send/receive deletion records to/from other deletion modules.

Figure 15:
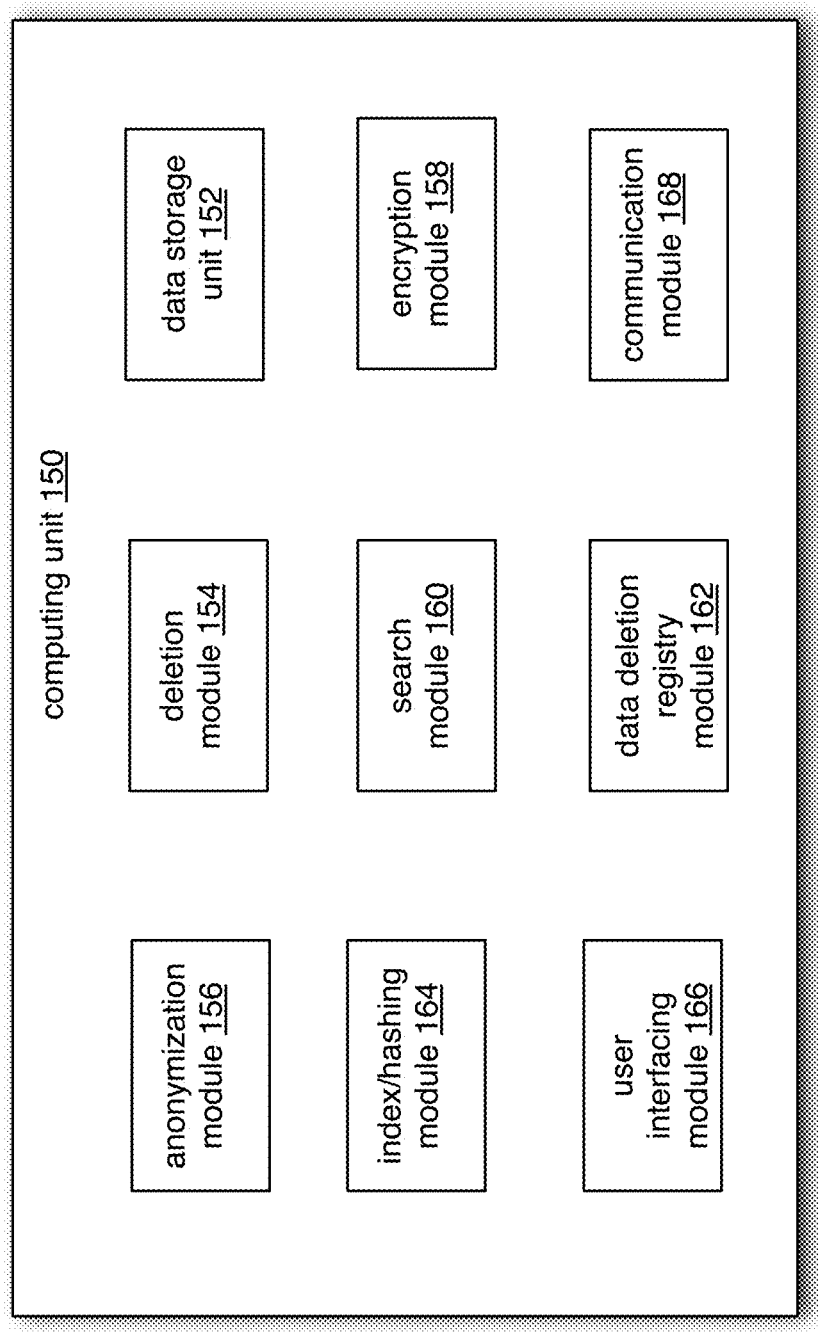
FIG. 15 is a functional block diagram of a computing unit.

FIG. 15 is a functional block diagram of an alternative embodiment of a computing unit. Computing unit 150 represents any computing unit described herein including computing units 12a and 12b. The modules of computing unit 150 may be formed using any known logic implementation including hardware, software, programmable logic controllers, field programmable gate arrays, or any combination thereof. Computing unit 150 includes a data storage unit 152 that stores data, records and files and a deletion module 154 that operates to compare the data, records and files stored in data storage unit 152. Deletion module 154 is configured to cooperatively purge data, records and files with anonymization module 156. Anonymization module 156 is configured to anonymize data, records and files by either deleting identifying information or by deleting an encryption key required for accessing the identifying information. Computing unit 150 also includes an encryption module 158 that is operable to assist with encrypting all or portions of data, records and files and in decrypting all or portions of data, records and files in a manner that is consistent with the aspects of the invention described herein. Stated differently, encryption module is operable to encrypt portions of data, records and files that may identify and that are subject to purging in a manner that is separate from other portions of data, records and files that may not be subject to deletion if a record is being anonymized.

Computing unit 150 also includes a search module 160 that searches for data, records and files that have an association record number or other identifying parameter stored within data deletion registry module 162. The identifying parameter can include the contents itself of the data, records and files. In one embodiment, computing unit 150 also includes an index/hashing module 164 that is operable to perform a hashing routine on an index of data deletion records identified within data deletion registry module 162. Finally, computing unit 150 includes a user interface module 166 for communicating with a user to receiver user commands and to produce information to the user as well as a communication module 168 that allows computing unit 150 to communicate by wireless and wired communication pathways.

Figure 16:
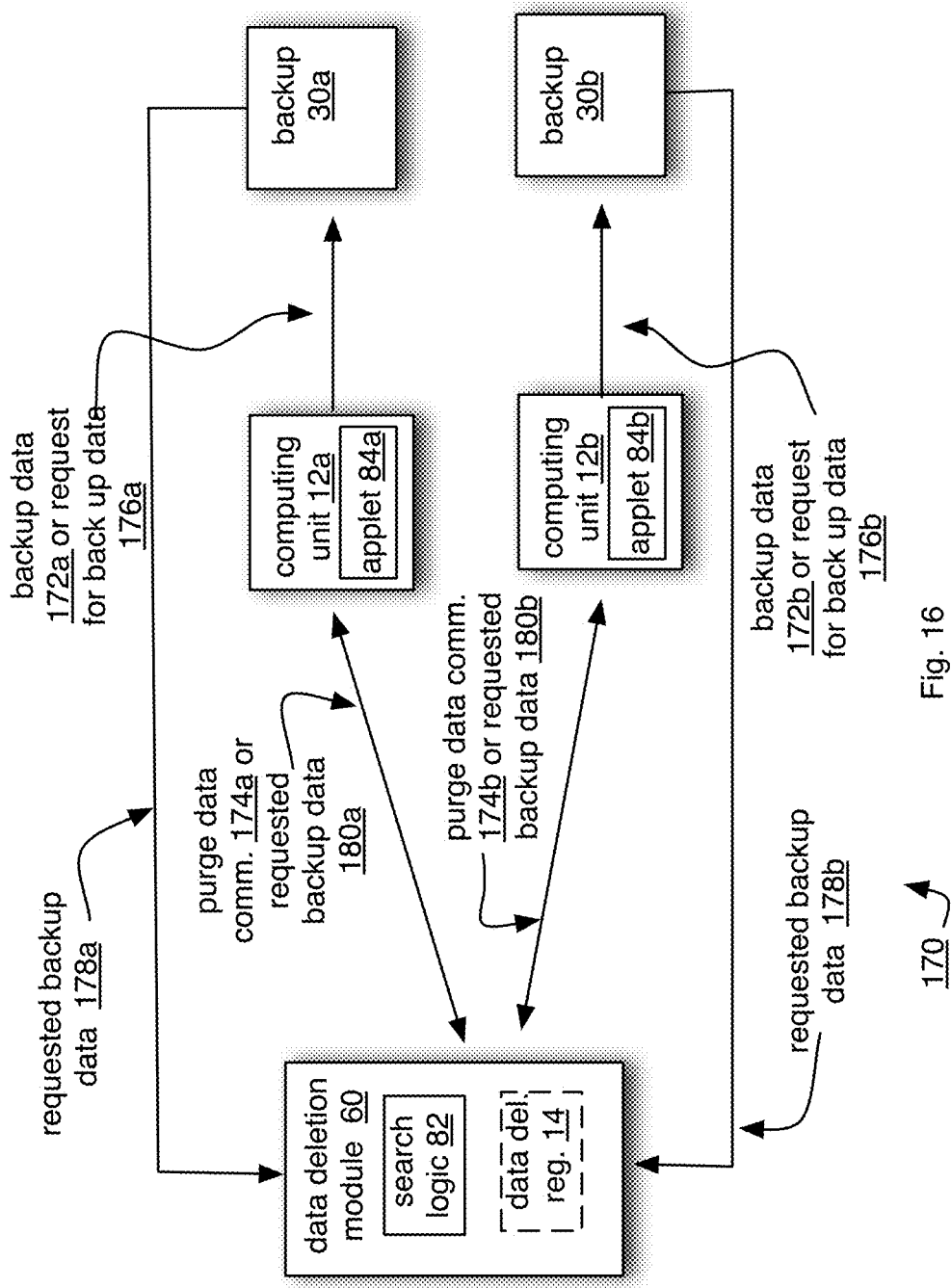
FIG. 16 is a system diagram for identifying re-deleting purged data as backup data is produced from a backup data storage system to a computing via a separate data deletion module.

FIG. 16 is a system diagram for identifying re-deleting purged data as backup data is produced from a backup data storage system to a computing unit via a separate data deletion module. Referring to FIG. 16, a network 170 includes computing units 12a-b and backup units 30a-b and a data deletion module 60. Computing units 12a-b include applets 84a-b, respectively and data deletion module 60 includes search logic 82. Computing unit 12a and backup unit 30a will be used to explain operation according to this embodiment of the invention. Operation with respect to computing unit 12b and backup unit 30b will be similar.

Generally, a data deletion module 60 establishes a link to computing unit 12a via applet 84a to search the records of computing unit 12a for purged records/files. Computing unit 12a also produces backup files for storage in backup 18a. When backup files are to be restored/rebased, they are transmitted via data deletion module 60 that compares the files to the deletion registry prior to forwarding to computing unit 12a for restoration. Previously purged files are purged again in appropriate manner and are not forwarded to computing unit 12a as requested.

More specifically, computing unit 12a produces backup data, records and files 172a to backup unit 30a either periodically, upon a specified event, or as requested. Subsequently, computing unit 12a purges a record in any of the previously described manners (complete deletion, partial deletion (to anonymize), sanitization, deletion of an encryption key to make the entire data, record or file inaccessible, or deletion of an encryption key to a portion of the data, record or file inaccessible to anonymize the data, record or file). Once a data, record or file is purged, computing unit 12a engages in purge data communications 174a with data deletion module 60 to update a data deletion registry 14 with identifying information for the purged data, record or file. Data deletion registry 14 is shown in a dashed line to indicate that data deletion registry 14 may be disposed within and be a part of data deletion module 60 or it may be external to data deletion module 60 as shown in prior figures.

One aspect of the embodiment of the invention is that search logic 82 establishes a communication link with computing unit 12a to search data, records and files stored therein to identify previously purged data, records and files identified in a data deletion registry. Another aspect of the invention is that data deletion module 60, and more particularly search logic 82, establishes a communication pathway (an encrypted tunnel in one embodiment) with computing unit 12a via applet 84a. Yet another aspect of the embodiment of the invention is that computing unit 12a produces a backup copy of its data, records and files 172a to backup unit 30a to create backup copies of the data, records, and files.

On occasion, computing unit 12a with transmit a request 176a to backup unit 30a to retrieve backup data, records, or files. In the described embodiment, backup unit 30 produces the requested data, records or files 178a to data deletion module 60. Data deletion module will compare the received data, records or files to contents of the data deletion registry 14. Any data, record or file that it receives from backup unit 30a that was previously purged as determined by comparing the received backup data, records or files to the contents of data deletion registry 14 is re-purged in the same manner as it was purged before. If the data, record or file was anonymized, the data, record or file is produced to computing unit 12a in the anonymized form. Otherwise, the data, record or file is deleted. All other data, records or files received that are not identified on the data deletion registry 14 are passed through or transmitted as well as the anonymized data are transmitted as requested backup data 180a to computing unit 12a to comply with the backup request 172a that was transmitted to backup unit 30a. In the exemplary embodiment of FIG. 16, data deletion registry 14 is disposed within data deletion module 60. Alternatively, data deletion registry 14 may be separate but communicatively coupled with data deletion module 60 to provide support for search logic 82 operations to identify previously purged data, records and files that have been re-based or restored.

Figure 17:
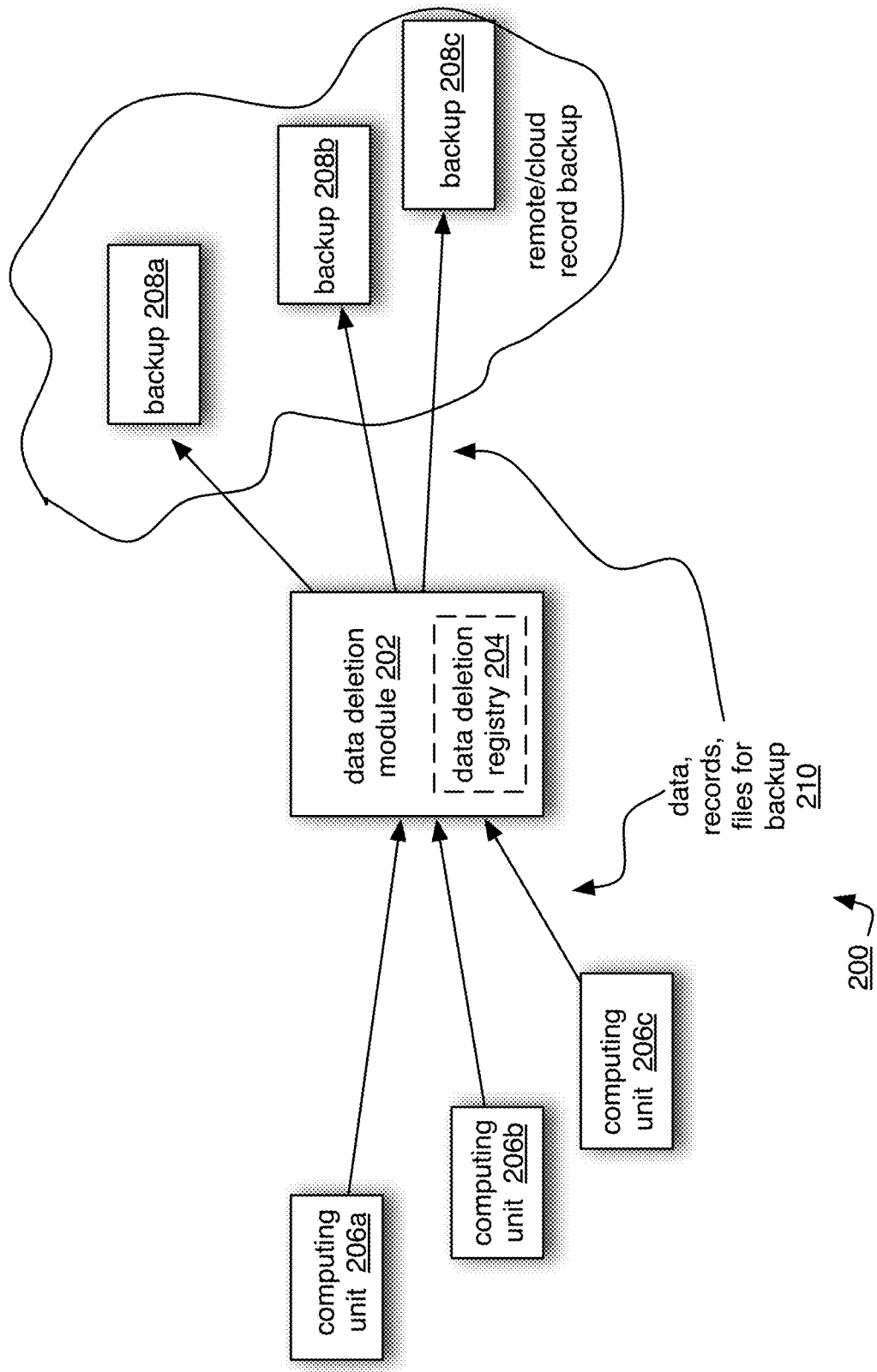
FIGS. 17 and 18 are network diagrams that illustrate a cloud based record backup system that operates in conjunction with a data deletion module.
Figure 18:
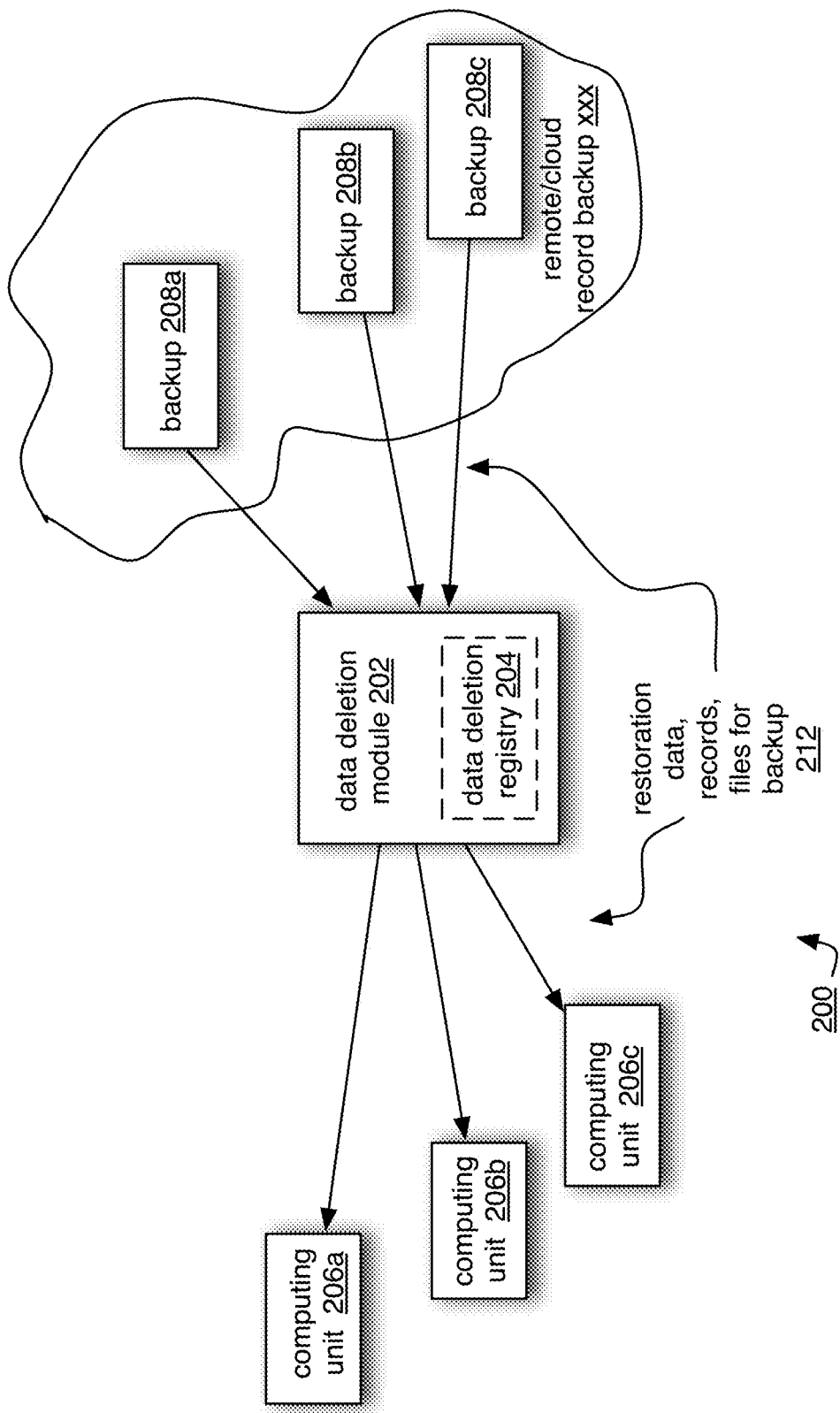

FIGS. 17 and 18 are network diagrams that illustrate a cloud based backup system that operates in conjunction with a data deletion module. Referring to FIG. 17, a network 200 includes a data deletion module 202 that includes a data deletion registry 204 either disposed therein as shown or in communication therewith but remote from data deletion module 202. Data deletion module 202 is communicatively coupled to computing units 206a-c as well as backup units 208a-c. Backup units 208a-c comprise cloud based backup servers that service the backup needs of computing units 206a-c. One aspect of the embodiment of FIG. 17 is that computing units 206a-c produce backup data, records and files 210 for backup storage by one or more of backup units 208a-c via data deletion module 202. When data deletion module 202 receives the data, records and files from one or more of the computing units 206a-c, data deletion module 202 compares the data, records and/or files received to the contents of data deletion registry 204 prior to producing the data, records and/or files to one or more of backup units 208a-c. Any data, records or files identified within data deletion registry 204 are purged (deleted or anonymized). Any anonymized data may, according to design implementation, be forwarded to one or more of backup units 208a-c for storage.

An additional aspect of the embodiment of FIG. 17 (and also FIG. 18 described below) is that data deletion module 202 is operable and configured to search the contents of backup units 208a-c in the cloud based storage for previously purged files identified within data deletion registry 204. Further, it should be noted that data deletion registry 204 may be disposed either within or external do data deletion module 202.

Referring now to FIG. 18, network 200 is shown again. Here, it may be seen that one or more of backup units 208a-c produce restoration data, records, and/or files 212 in response to a request for data, records or files that had previously been backed up. The request for data, records or files is not shown here but it should be understood to be similar to the request 176a shown in FIG. 16. One aspect of the embodiment of FIG. 18 is that the restoration data, records, and/or files produced by one or more of backup units 208a-c are produced to one or more of computing units 206a-c via data deletion module 202.

When data deletion module 202 receives the data, records and files from one or more of the backup units 208a-c, data deletion module 202 compares the data, records and/or files received to the contents of data deletion registry 204 prior to producing the data, records and/or files to one or more of computing units 206a-c. Any data, records or files identified within data deletion registry 204 are purged (deleted or anonymized). Any anonymized data may, according to design implementation, be forwarded to one or more of computing units 206a-c. It should be noted that the embodiments of FIGS. 17 and 18 are not required to be implemented together. The embodiment of FIG. 18, for example, may be employed even if the data, records and files are produced to backup units 208a-c directly from computing units 206a-c (i.e., without employing the embodiment of FIG. 17).

Figure 19:
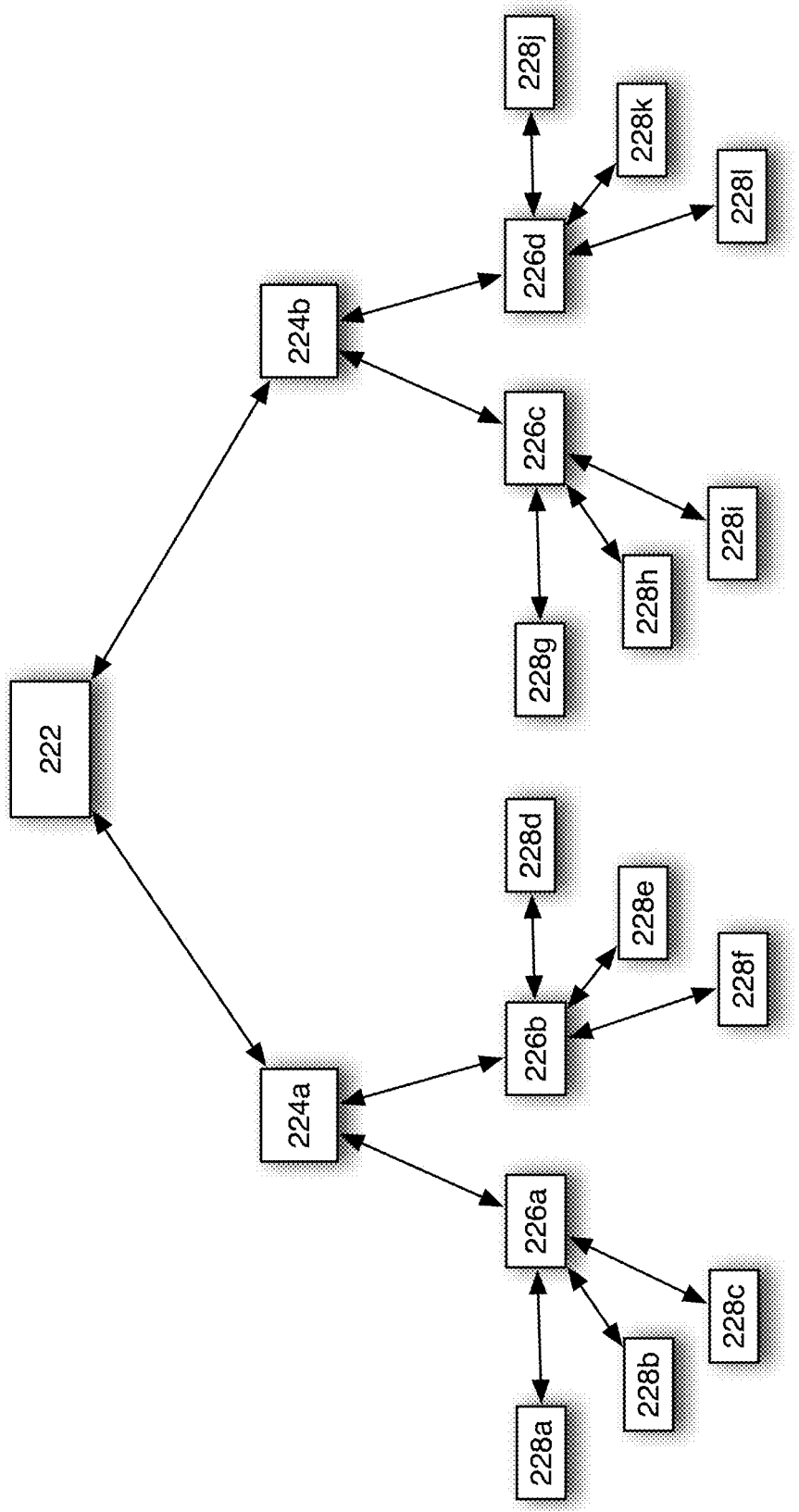
FIG. 19 is a network diagram that illustrates master control of purge schemes according to one embodiment of the invention.

FIG. 19 is a functional block diagram that illustrates a network in which a master controller is utilized to control purge schemes according to one embodiment of the invention. Referring to FIG. 19, network 220 includes a master deletion registry 222 controls purge schemes that are managed by deletion registries 224a-b. Deletion registry 224a controls purging by data deletion modules 226a-b while deletion registry 224b controls purging by data deletion modules 226c-d. Data deletion module 226a purges data, records and files for computing units 228a-c. Data deletion module 226b purges data, records and files for computing units 228d-f. Data deletion module 226c purges data, records and files for computing units 228g-i. Data deletion module 226d purges data, records and files for computing units 228j-l.

In an alternative embodiment, the control or purge data may be varied. For example, in one embodiment, data deletion registries 224a-b and 226a-d contain the same types of information and share information to maintain common purge information. Additionally, data deletion registries 224a-b and 226a-d produce purge information to master deletion registry 222 that is filtered to exclude purge data from a specific database or a specific table within a specific database.

Generally, this embodiment of the invention shows master control of purge schemes in relation to downstream agencies or groups. Accordingly, as a previously purged record is found, the appropriate purging/anonymization may occur. For example, if the records are criminal records, and depending on whether a down stream agency is federal, state, county or city, the required type of anonymization/purging may vary. Master deletion registry 222 generally serves to maintain control of the purging at the various levels to ensure that the appropriate type of purging occurs.

More specifically, the data deletion modules 226a-d may be disposed to serve data needs for differing organizations having differing requirements and/or schemes for purging data, records and files. For example, data deletion module 226a may serve an entity that deletes are data, records and files that are to be purged. Data deletion module 226b may serve an entity that deletes are data, records and files that are to be purged by deleting associated encryption keys. Data deletion module 226c may serve an entity that anonymizes data, records and files that are to be purged by deleting specified identifying information within the data, records and files. Data deletion module 226d may serve an entity that anonymizes data, records and files that are to be purged by deleting associated encryption keys of the specified portions of the data, records and files that may be used to identify.

One aspect of the embodiment of FIG. 19 is that the many differing forms and schemes of purging data, records and files must managed so that, for the specific computing unit 228a-1, the appropriate type/level of purging occurs. Master deletion registry 222 is communicatively coupled to provide overall management of the various purge schemes that are employed at the lower levels.

Figure 20:
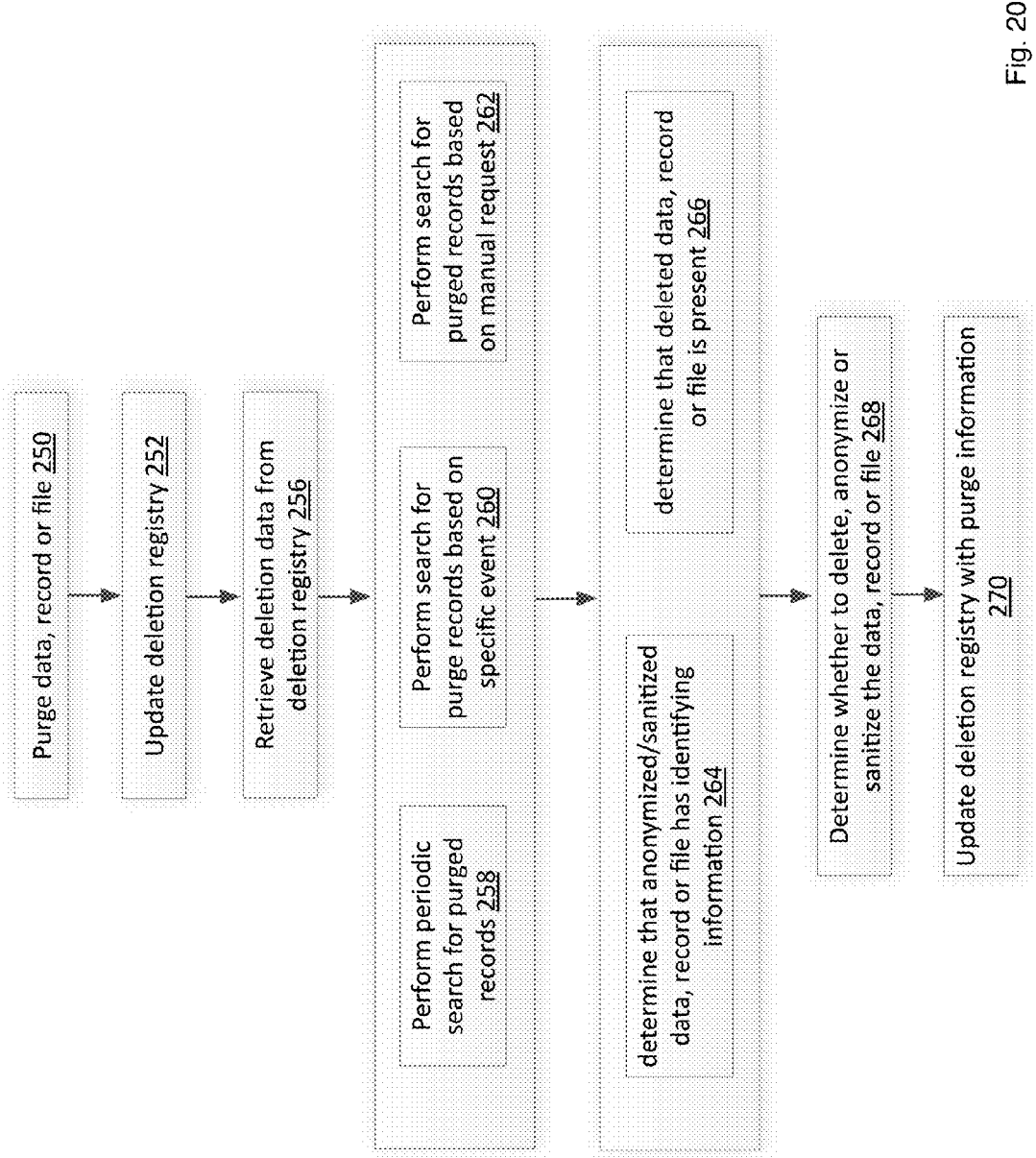
FIG. 20 is a flow chart of a method according to one embodiment of the invention for purging data, records or files.

FIG. 20 is a flow chart of a method according to one embodiment of the invention for purging data, records or files. The method begins the purging a data, record or file (250). Purging includes deleting, deletion a portion to anonymize, deleting an encryption key used to encrypt all or a portion of the data, record or file (to render inaccessible or to anonymize) or sanitizing a portion of the data, record or file by replacing information therein with fictional information (e.g., a real name and address are replaced by a made-up name and address). After purging, the method includes updating a deletion registry (252). Subsequently, the method includes retrieving deletion data (also referenced herein as purge information) from the deletion registry (256). In one embodiment, this purge information is stored in a cache to support subsequent searching for purged data, records and files.

To find previously purged data, records and files, periodic searches may be performed (258), searches may be performed in response to a specified event (260), or upon a request (262). When a search is performed, logic performing the search (e.g., a deletion module 60), may determine that an anonymized or sanitized data, record or file has identifying information (264) or that a deleted data, record or file is present (266). In either case, the data, record or file that is present with identifying information must be re-purged based on the contents of a data deletion registry. Accordingly, the method includes determining whether to delete, anonymize or sanitize the data, record or file (268). Finally, the method includes updating the deletion registry with updated purge information.

Figure 21:
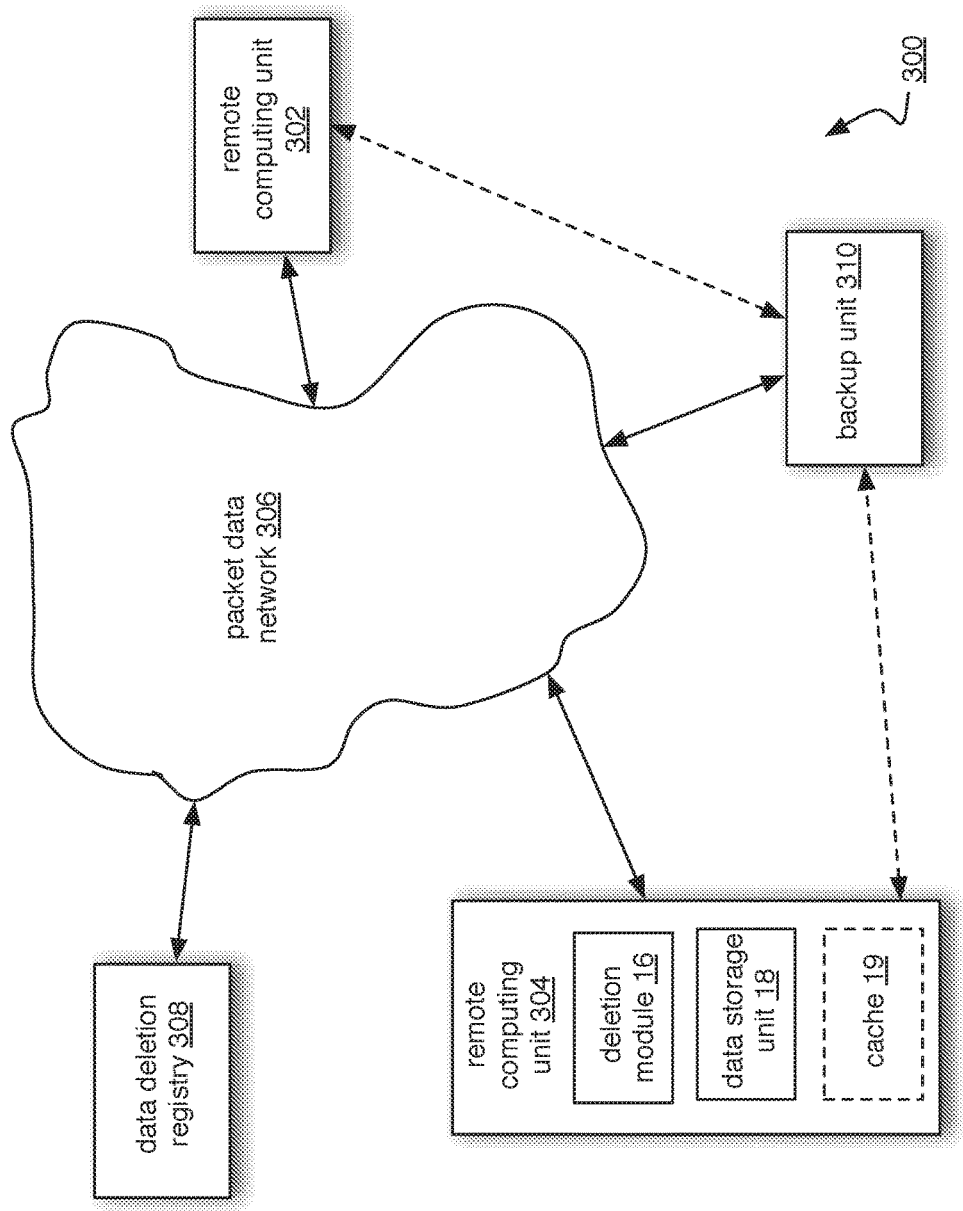
FIG. 21 is a functional block diagram of a data deletion network 300 according to one embodiment of the invention.

FIG. 21 is a functional block diagram of a data deletion network 300 according to one embodiment of the invention. A remote computing unit 302 and a remote computing unit 304 are both connected to a packet data network 306. Each of computing units 302 and 304 are similar to each other and to the various embodiments of computing units as described herein. A data deletion registry 308 also is communicatively coupled to packet data network 306. In this embodiment, remote computing unit 304 includes a deletion module 16, a data storage unit 18 and, optionally, a cache 19 operably disposed within computing unit 304. A backup unit 310 also is coupled to packet data network 306. Alternatively, backup unit 310 may be coupled directed to or even be a part of remote computing unit 304 or remote computing unit 302 or both (they each have a backup unit 310 disposed therein). In the described embodiment, however, backup unit 310 is coupled to packet data network 306 and provides backup services to store backup copies of data, records and files of computing units 304 and 302.

Deletion module 16, as with other deletion modules described herein performs searches of data, records and files stored within data storage unit 18 to attempt to find data, records and files that have been previously purged (deleted, anonymized or sanitized). As before, such data, records and files may be present because of a backup, restoration, or rebasing operation. Deletion module 16 searches data storage unit 18 based on purge information stored within at least one of data deletion registry 308 or cache 19. It should be understood that remote computing unit 304 retrieves purge information from data deletion registry 308 for its searches and/or for storing within cache 19 via packet data network 306.

Figure 22:
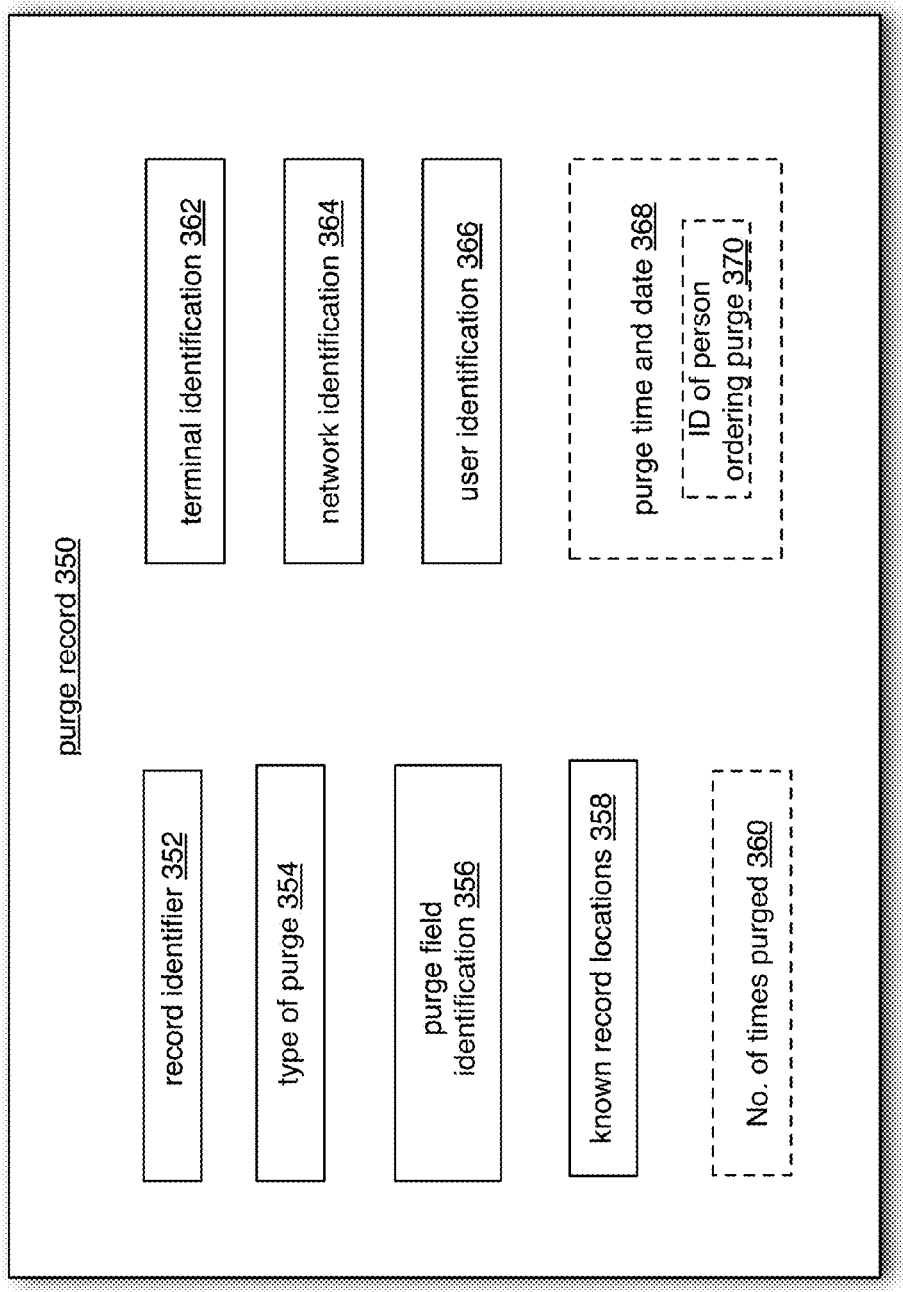
FIG. 22 is an illustration of a purge record according to one embodiment of the invention.

FIG. 22 is an illustration of a purge record according to one embodiment of the invention. Referring to FIG. 22, a purge record 350 is shown having a plurality of associated data fields to assist with the identification of a source of an unpurged data record that corresponds to a previously purged data record. For example, a user may have a backup copy of a data record on a backup computer (e.g., a laptop used on occasion) that does not get properly purged. If the backup computer is not connected to a network or is not powered on when a data record is purged from systems across the network, then an attempt to purge a record completely fails because of the retained copy on the backup computer. When the user utilizes the backup computer, the previously purged record (ie., the unpurged record) may be reintroduced. Accordingly, purge record 350 is created for every purged record to assist in indentifying a source that reintroduces a previously purged record so that the data record may be repurged at all locations including the source of the unpurged data record. Thus, in the described example, purge record 350 includes the record identifier 352, the type of purge 354, the purge field identification 356, the known record locations 358, the number of times the data record has been purged 360, a terminal identification 362, a network identification 364 and a user identification 366.

Additionally, as may be seen, a record of purge time and dates 368 are kept for purge records. In one embodiment, an identity of the person 370 ordering the purge is also kept. One purpose for keeping the purge record similar to purge record 350 is to assist in determining a source of a purged record or record portion that has re-appeared. Information such as number of times purged 360 and the purge time and date (as well as the ID of the person purging the record) may assist in helping determine the source of the purge record that has re-appeared or may be used to set an alarm or flag to prompt an investigation regarding the purged record. Similarly, the terminal identification 362, network identification 364 and user identification 366 of a user "touching" the purged record may assist in determine where a copy of the purged record may be stored. The record identifier 352, the type of purge 354 and the purge field identification 356 are as described previously.

Figure 23:
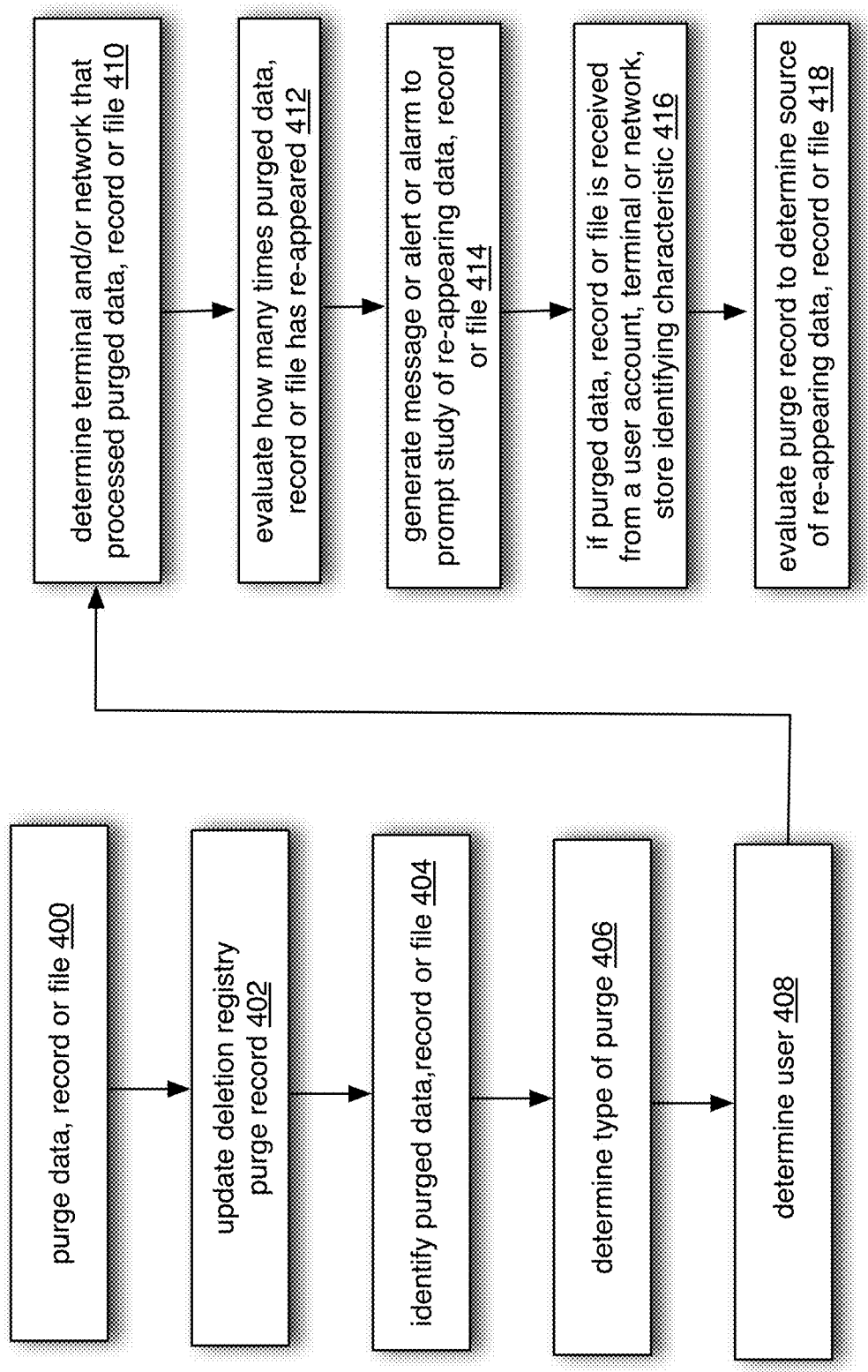
FIG. 23 is a flow chart illustration a method for identifying a source of an unpurged record according to one embodiment of the invention.

FIG. 23 is a flow chart illustration a method for identifying a source of an unpurged record according to one embodiment of the invention. The method includes purging data, a record or a file (400) and updating a deletion registry purge record (402). Subsequently, when a previously purged record re-appears, the method includes identifying the purged data, record or file (404). While the method implicitly includes purging the data, record or file again, the method also includes determining the type of purge that previously occurred (as previously described), a user ID of a user that "touched" the purged record (408), and a terminal or network that touched the purged record (410). The method further includes evaluating how many times the purged data, record or file has re-appeared (412) and, according to specified rules for generating an alarm or alert flag or message, generating a message or alert or alarm to prompt an investigation (or study) of the re-appearing data, record or file (414). Depending upon user setting, such an alert, flag or message may be generated after a specified number of times or even upon it happening for the first time.

If the purged data, record or file is received from a user account, terminal or network, the method also includes storing the identifying characteristic (416) and subsequently evaluating the purge record to determine the source of the re-appearing data, record or file (418).

While the invention is susceptible to various modifications and alternative forms, specific embodiments thereof have been shown by way of example in the drawings and detailed description. It should be understood, however, that the drawings and detailed description thereto are not intended to limit the invention to the particular form disclosed, but, on the contrary, the invention is to cover all modifications, equivalents and alternatives falling within the spirit and scope of the present invention as defined by the claims. As may be seen, the described embodiments may be modified in many different ways without departing from the scope or teachings of the invention.

The invention claimed is:

1. A data deletion system, comprising:
communication circuitry:
a non-transitory memory containing computer instructions:
one or more processors coupled to retrieve and execute the computer instructions to perform the steps of:
determining that a data, record or file has been or is to be purged;
commanding a backup server to purge a backup copy of the data, record or file:
searching data, records and files stored on a remote computing unit's memory for an identifying characteristic via the communication circuitry that identifies a previously purged data, record or file on a periodic basis;

updating data within a data deletion registry;

comparing the identifying characteristic to identifying characteristics stored in the data deletion registry that tracks purged data, records and files;

determining that a previously purged data, record or file has been restored or re-based;

re-purging the previously purged data, record or file by deleting the encryption key for the data, record or file or by deleting or anonymizing the data record or file: and storing an indication of how many times the data, record or file has been purged either by deletion, by deletion of the encryption key or anonymized, wherein the stored indication is used for generating an alarm or alert flag or message identifying the reappearing data, record or file.

2. The computing unit of claim 1 wherein purging comprises, with respect to data, records and files, any one of:

deleting all of a data, record or file;

deleting a portion of a data, record or file;

deleting an encryption key used to encrypt all of the data, record or file;

deleting an encryption key used to encrypt a portion of the data, record or file; and sanitizing a portion of a data, record or file by replacing information in the data, record or file with fictional information.

3. The computing unit of claim 1 wherein searching step is performed by the computing unit on data that is stored on the remote computing unit's memory.

4. The computing unit of claim 1 wherein searching step is performed by a data deletion module.

5. The computing unit of claim 1 wherein the data deletion registry is disposed within the computing unit.

6. The computing unit of claim 1 wherein the data deletion registry is disposed within a data deletion module.

7. The computing unit of claim 1 wherein the data deletion registry is disposed external to the computing unit and is communicatively coupled to the computing unit.

8. The computing unit of claim 1 wherein the computing unit includes an applet stored therein that establishes a communication with an external data deletion module to allow the data deletion module to search the contents of the computing unit.

9. The computing unit of claim 1 wherein the computing unit produces deletion information to the data deletion registry to identify purged data, records and files.

10. The computing unit of claim 1 wherein the step of purging the data, record or file includes deleting the data, record or file.

11. The computing unit of claim 1 wherein the step of purging the data, record or file includes deleting a portion of the data, record or file to anonymize the data, record or file.

12. The computing unit of claim 1 wherein the step of purging the data, record or file includes deleting an encryption key required to access the data, record or file.

13. The computing unit of claim 1 wherein the step of purging the data, record or file includes sanitizing the data, record or file by replacing information in the data, record or file with fictional information.

14. The computing unit of claim 1 further including restoring a backup data, record or file and then comparing the restored data, record or file to the contents of the deletion registry to determine if the restored backup data, record or file should be re-purged.

15. The computing unit of claim 1 further including restoring a backup data, record or file by producing a backed-up data, record or file to a data deletion module and then comparing the restored data, record or file to the contents of the deletion registry to determine if the restored backup data, record or file should be re-purged or if the backup data, record or file may be produced to the computing unit.

* * * * *